US009555287B2

(12) United States Patent
Fiorello (10) Patent No.: US 9,555,287 B2
(45) Date of Patent: Jan. 31, 2017

(54) POWER ICE SCREW SYSTEM AND METHODS OF USE (71) Applicant: Albert Fiorello, Greenwood Village, CO (US)

(72) Inventor: Albert Fiorello, Greenwood Village, CO (US)

( * ) Notice: Subject to any disclaimer, the term of this patent is extended or adjusted under 35 U.S.C. 154(b) by 0 days.

(21) Appl. No.: 15/052,289

(22) Filed: Feb. 24, 2016

(65) Prior Publication Data

US 2016/0166883 A1 Jun. 16, 2016

Related U.S. Application Data (63) Continuation of application No. 14/283,095, filed on May 20, 2014, now Pat. No. 9,303,456, which is a
(Continued)

(51) Int. Cl.
| | | |
|---|---|---|
| E21B 7/00 | (2006.01) |
| A63B 29/00 | (2006.01) |
| A63B 29/02 | (2006.01) |
| A63B 29/08 | (2006.01) |
| B23B 41/00 | (2006.01) |

(52) U.S. Cl.
CPC .............. *A63B 29/025* (2013.01); *A63B 29/02* (2013.01); *A63B 29/08* (2013.01); *B23B 41/00* (2013.01); *E21B 7/008* (2013.01); *Y10S 248/925* (2013.01)

(58) Field of Classification Search
CPC .......... E21B 10/02; E21B 7/008; E21B 10/44; A63B 29/025; A63B 29/027; A63B 29/028; Y10S 248/925; B23B 41/00; B23B 35/00; B23B 11/00
See application file for complete search history.

(56) References Cited

U.S. PATENT DOCUMENTS

| 1,621,662 A | * | 3/1927 | Gartin | ................... E21B 19/086 |
| | | | | 92/113 |
| 4,640,552 A | * | 2/1987 | Page | ...................... E02B 15/02 |
| | | | | 175/17 |

(Continued)

FOREIGN PATENT DOCUMENTS

| DE | 3705347 A1 * | 9/1988 | ........... A63B 29/025 |
| DE | 4304618 C1 * | 3/1994 | ........... A63B 29/025 |

(Continued)

*Primary Examiner* — Daniel P Stephenson
(74) *Attorney, Agent, or Firm* — Leyendecker & Lemire, LLC (57) ABSTRACT

A power ice screw system including an ice screw and screw adapter configured to engage the ice screw, thus enabling use of a power drill to install the ice screw in an ice feature, is described. The ice screw includes a drive head configured to engage the screw adapter. The screw adapter includes clearing ports that enable the adapter to expel ice that enters the adapter from within the ice screw hollow core. The ice screw core extends through the drive head to permit ice to flow through the ice screw and into the adapter. A cutting member resides within the screw adapter, typically disposed between two clearing ports. The cutting member can be flanked by two flanges configured to direct ice that has been disrupted by the cutting member outwardly through the clearing ports. The power drill is typically a lightweight battery powered electric driver.

17 Claims, 12 Drawing Sheets

Related U.S. Application Data continuation-in-part of application No. 13/969,478, filed on Aug. 16, 2013, now Pat. No. 9,217,288.

(56) References Cited

U.S. PATENT DOCUMENTS

| | | | | |
|---|---|---|---|---|
| 5,118,061 A * | 6/1992 | Byrne | .................. | A63B 29/027 248/231.9 |
| 5,213,170 A * | 5/1993 | Savitski | .................. | E21B 17/22 175/323 |
| 5,782,442 A * | 7/1998 | Kwak | .................. | A63B 29/027 248/231.9 |
| 6,102,135 A * | 8/2000 | Shaw | .................. | E21B 11/005 175/20 |
| 6,505,799 B1 * | 1/2003 | Bercaw | .................. | A63B 29/025 248/231.9 |
| 6,607,340 B2 * | 8/2003 | Petzl | .................. | A63B 29/027 248/231.9 |
| 6,626,250 B1 * | 9/2003 | Ham | .................. | A01K 97/01 175/18 |
| 6,705,412 B1 * | 3/2004 | Wark | .................. | A01K 97/01 175/121 |
| 7,347,403 B2 * | 3/2008 | Belcourt | .................. | A63B 29/025 248/231.9 |
| D718,613 S * | 12/2014 | Petzl | .................. | A63B 29/02 D8/387 |
| 8,899,897 B2 * | 12/2014 | Maurice | .................. | A63B 29/025 411/387.1 |
| 9,303,456 B1 * | 4/2016 | Fiorello | .................. | A63B 29/02 |
| 2004/0240954 A1 * | 12/2004 | Chilcott | .................. | E21B 7/008 408/239 A |
| 2005/0205298 A1 * | 9/2005 | Kollasch | .................. | E21B 7/008 175/18 |
| 2006/0169492 A1 * | 8/2006 | Kowalewski | .......... | A01K 97/01 175/18 |
| 2008/0179105 A1 * | 7/2008 | Duncan | .................. | B23B 51/0426 175/420.1 |
| 2008/0199336 A1 * | 8/2008 | Brensinger | .......... | A63B 29/02 417/472 |
| 2013/0101366 A1 * | 4/2013 | Sanders | .............. | B23B 51/0406 408/1 BD |
| 2014/0099169 A1 * | 4/2014 | Maurice | .................. | B23D 67/10 407/29.15 |

FOREIGN PATENT DOCUMENTS

| | | | | |
|---|---|---|---|---|
| DE | 20108831 U1 * | 9/2001 | .............. | B23B 31/00 |
| FR | 2568131 A1 * | 1/1986 | ........... | A63B 29/025 |
| FR | 2572941 A1 * | 5/1986 | ........... | A63B 29/025 |
| FR | 2863899 A1 * | 6/2005 | ............. | A63B 29/02 |
| FR | 2978052 A1 * | 1/2013 | ........... | A63B 29/025 |
| GB | 2462836 A * | 2/2010 | ........... | A63B 29/025 |
| WO | WO 2015023594 A2 * | 2/2015 | ............. | A63B 29/02 |

* cited by examiner

POWER ICE SCREW SYSTEM AND METHODS OF USE

CROSS-REFERENCE TO RELATED APPLICATIONS

This application is a continuation of application Ser. No. 14/283,095, filed May 20, 2014, which is a continuation-in-part of application Ser. No. 13/969,478, filed Aug. 16, 2013

FIELD OF THE INVENTION

The present invention relates generally to devices and methods for using ice screws while ice climbing, and more specifically to devices and methods for driving the ice screws into ice by use of a power tool.

BACKGROUND

Ice climbers usually use ice screws to create anchor points in ice features the climbers are attempting to climb. The ice screws are typically temporarily installed in the ice as a lead climber (leader) ascends, and carabiners are often affixed to the installed ice screw. Climbing rope is generally passed through the carabiner such that if the leader falls, his or her belayer can arrest the fall by preventing the rope from running up through the carabiner from the belayer's position beneath the leader. With the climbers (leader and belayer), rope, and ice screw/carabiner so configured, force of the leader's fall is transmitted to the ice screw from the rope, and the leader is suspended from the ice screw after falling as far as slack in the rope permits. To successfully arrest the leader's fall, the ice screw must be securely installed in the ice so it does not pull out when force from the fall is transmitted to the ice screw. A following climber may remove the ice screws as he or she follows the leader's route.

The leader must usually install an ice screw with one hand because his or her other hand is occupied by grasping an ice tool (such as an ice axe), the pick of which the leader generally embeds in the ice above his or her head to help maintain a perch on the ice. The one-handed installation typically requires the leader to push against the ice screw while simultaneously rotating the screw, which initiates boring into the ice by a cutting tip of the screw.

A climber must frequently chip a small hole or depression in the ice with an ice tool, and subsequently initiate boring of the ice screw in the small hole. The initial boring of the ice screw is typically accomplished by the climber twisting his or her wrist and forearm, and is usually performed in multiple increments of rotation. Increments of rotation are typically limited to a range of about 60 degrees to about 180 degrees due to physiological constraints of human wrist/forearm rotation. When the climber first initiates boring into the ice with the ice screw, before the screw establishes sufficient purchase to remain in the ice in the absence of assistance from the climber, the climber must, between screw rotation increments, let go of the screw to unwind his or her wrist/forearm without unscrewing the ice screw. This initial boring requires considerable finesse, and must be repeated for each screw installed during a climb. Not surprisingly, the risk of dropping ice screws inadvertently while attempting to install the screws is a concern.

Where a climber is using one arm for installing an ice screw in the ice, fatigue in his or her other arm and shoulder is exacerbated because the climber is using only one arm instead of two for maintaining his or her perch on the ice. Strength available for other physically demanding aspects of ice climbing is consequently diminished. Means for reducing the time it takes to install an ice screw, and the exacerbated fatigue that accompanies such installation, is therefore needed. Reducing the risk of dropping an ice screw when first starting an installation is also highly desirable.

DETAILED DESCRIPTION

Embodiments of a power ice screw system according to the present invention comprise a screw adapter configured to engage and twist an ice screw. One embodiment of the system further comprises an ice screw permanently equipped with a drive head configured to engage the screw adapter. Another embodiment comprises a selectively removable, typically slide-on, drive head adapter that fits over the end of a standard ice screw. The screw adapter is typically removably or semi-permanently coupled to a relatively lightweight battery powered electric drill. For the purposes of the present invention, power drill refers to drills, impact drivers, hammer drills, and similar power tools designed and configured to rotate a cutting tool or driving tool, such as, but not limited to, a spade bit, a twist drill bit, a screw driver bit, a torx driver bit, external torx sockets, hex bits, and standard sockets configured to receive and drive hexagonal bolts and nuts. Power drills are typically, but not necessarily, electrically powered. The power ice screw system enables more rapid and facile placement of the ice screw in ice features, compared to manual ice screw placement. Thus by use of the power ice screw system, a climber can avoid manual insertion of ice screws, thereby diminishing the fatigue and risk of dropping a screw that typically accompanies manual insertion.

The screw adapter typically, but not necessarily, resembles a modified hex socket for a socket wrench. Accordingly, the screw adapter includes a drive head receptacle configured to receive a hexagonal bolt, nut, or drive head. A cutting member resides within the adapter, typically disposed between two debris clearing ports residing in cylindrical outer walls of the adapter. The cutting member can be flanked by two flanges configured to direct ice that has been disrupted by the member outwardly through the debris clearing ports.

Where the drive head receptacle of the screw adapter is hexagonal, ice screws for use with the screw adapter include one of an integral drive head or selectively removable drive head adapter sized and configured to be received within and securely engaged by drive head receptacle. The drive head resembles a hexagonal nut or bolt head.

In typical use, the screw adapter is affixed to a power drill, and a climber engages the drive head of an ice screw with the drive head receptacle. The climber then places a cutting tip of the ice screw against an ice feature and activates the power drill to bore into the ice with the screw. The climber generally does not need to chip a small hole or depression in the ice to get the ice screw started, as is typically required for manual installation of ice screws. The term ice feature refers to a frozen water fall, ice covered rock, glacier, crevasse, or similar ice formation, including man-made ice formations, typically ascended by ice climbers.

Ice screws typically include a hollow shaft that is open on each end because ice must be able to pass through the hollow shaft and subsequently exit the screw through an open end during placement of the screw in ice. Ice screws that become plugged are difficult or impossible to install. Accordingly, when boring into ice with an ice screw, an ice core typically passes from the cutting tip of the screw, through the hollow shaft, and out through the drive head, which is also typically hollow. An open ended cavity of the ice screw thus extends through the hollow shaft and the drive head, and the ice core is free to pass through the drive head and into the screw adapter. The ice core is then typically disrupted by the spinning cutting member and ejected out the debris clearing ports.

In some variations, the ice screws and/or the screw adaptors and drive head adapters are coated on the inside with an icephobic material to facilitate the movement of an ice core through the hollow cavity of an ice screw as it is drilled into an ice feature and to allow an ice screw to be more easily cleared of an ice core.

TERMINOLOGY

The terms and phrases as indicated in quotation marks (" ") in this section are intended to have the meaning ascribed to them in this Terminology section applied to them throughout this document, including in the claims, unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive; rather the term is inclusive, meaning either or both.

References in the specification to "one embodiment", "an embodiment", "another embodiment", "a preferred embodiment", "an alternative embodiment", "one variation", "a variation" and similar phrases mean that a particular feature, structure, or characteristic described in connection with the embodiment or variation, is included in at least an embodiment or variation of the invention. The phrase "in one embodiment", "in one variation" or similar phrases, as used in various places in the specification, are not necessarily meant to refer to the same embodiment or the same variation.

The term "couple" or "coupled" as used in this specification and appended claims refers to an indirect or direct physical connection between the identified elements, components, or objects. Often the manner of the coupling will be related specifically to the manner in which the two coupled elements interact.

The term "directly coupled" or "coupled directly," as used in this specification and appended claims, refers to a physical connection between identified elements, components, or objects, in which no other element, component, or object resides between those identified as being directly coupled.

The term "approximately," as used in this specification and appended claims, refers to plus or minus 10% of the value given.

The term "about," as used in this specification and appended claims, refers to plus or minus 20% of the value given.

The terms "generally" and "substantially," as used in this specification and appended claims, mean mostly, or for the most part.

The terms "removable", "removably coupled", "removably installed," "readily removable", "readily detachable", "detachably coupled", "separable," "separably coupled," and similar terms, as used in this specification and appended claims, refer to structures that can be uncoupled, detached, uninstalled, or removed from an adjoining structure with relative ease (i.e., non-destructively, and without a complicated or time-consuming process), and that can also be readily reinstalled, reattached, or coupled to the previously adjoining structure.

Directional or relational terms such as "top," bottom," "front," "back," "above," "beneath," and "below," as used in this specification and appended claims, refer to relative positions of identified elements, components, or objects, where the components or objects are oriented in an upright position as normally installed or used.

A First Embodiment Power Ice Screw System

A first embodiment power ice screw system 100 is illustrated in FIGS. 1-8. The first embodiment power ice screw system 100 comprises a screw adapter 110, an ice screw 150, and a power drill 175. The power ice screw system can also include an ice screw holster 185, shown in FIG. 8. The power drill of the first embodiment is typically, but not necessarily, a Makita model DT01W cordless impact driver powered by a lithium ion battery.

The screw adapter 110 includes a drive head receptacle 114 disposed at an adapter first end 115 and a first debris clearing port 118 disposed in an outer wall 120 of the screw adapter 110. The outer wall of the first embodiment is typically cylindrical. A second debris clearing port 119 resides in the outer wall 120 opposite the first debris clearing port (i.e. disposed 180° around the screw adapter 110 from the first port 118). The screw adapter 110 further comprises a cutting member 125 flanked by two flanges 127. The two flanges 127 meet at the cutting member 125 and diverge away from the cutting member as they approach the clearing ports 118, 119. The cutting member 125 of the first embodiment includes two flat inclined sides that meet at an angle to form an edge. The angle is preferably less than 90°, more preferably less than 45°, and most preferably less than 30°. In some embodiments, the cutting member includes a point formed by two flat inclined sides meeting at an acute angle. Variations include serrated cutting members.

The screw adapter 110 typically further comprises one or more protrusions 130 adapted to engage a complementary recess 155 in a flat side of the drive head 157 of the ice screw 150. Collectively, the protrusion 130 and the recess 155 form a detent that secures the ice screw 150 in the adapter and reduces the chances of the screw 150 becoming inadvertently dislodged from the adapter 110. The detent enables one-handed use of the power ice screw system. A user can generally readily dislodge the ice screw 150 from the adapter 110 by pulling the drill and adapter away from the ice screw after installation in ice. The protrusions 130 of the first embodiment screw adapter are ball bearings that reversibly intrude into the receptacles 114 by each protrusion protruding through a flat side 117 of the hexagonal receptacle 114. A spring housing 132 for each protrusion contains a spring that holds the protrusion 130 in place intruding into the receptacle 114 until force of the spring is overcome to push the protrusion 130 partially or fully out of the receptacle 114. Other means for removably securing the screw in a screw adapter includes magnets, which can be used in combination with the detents or alone.

Figure 1:
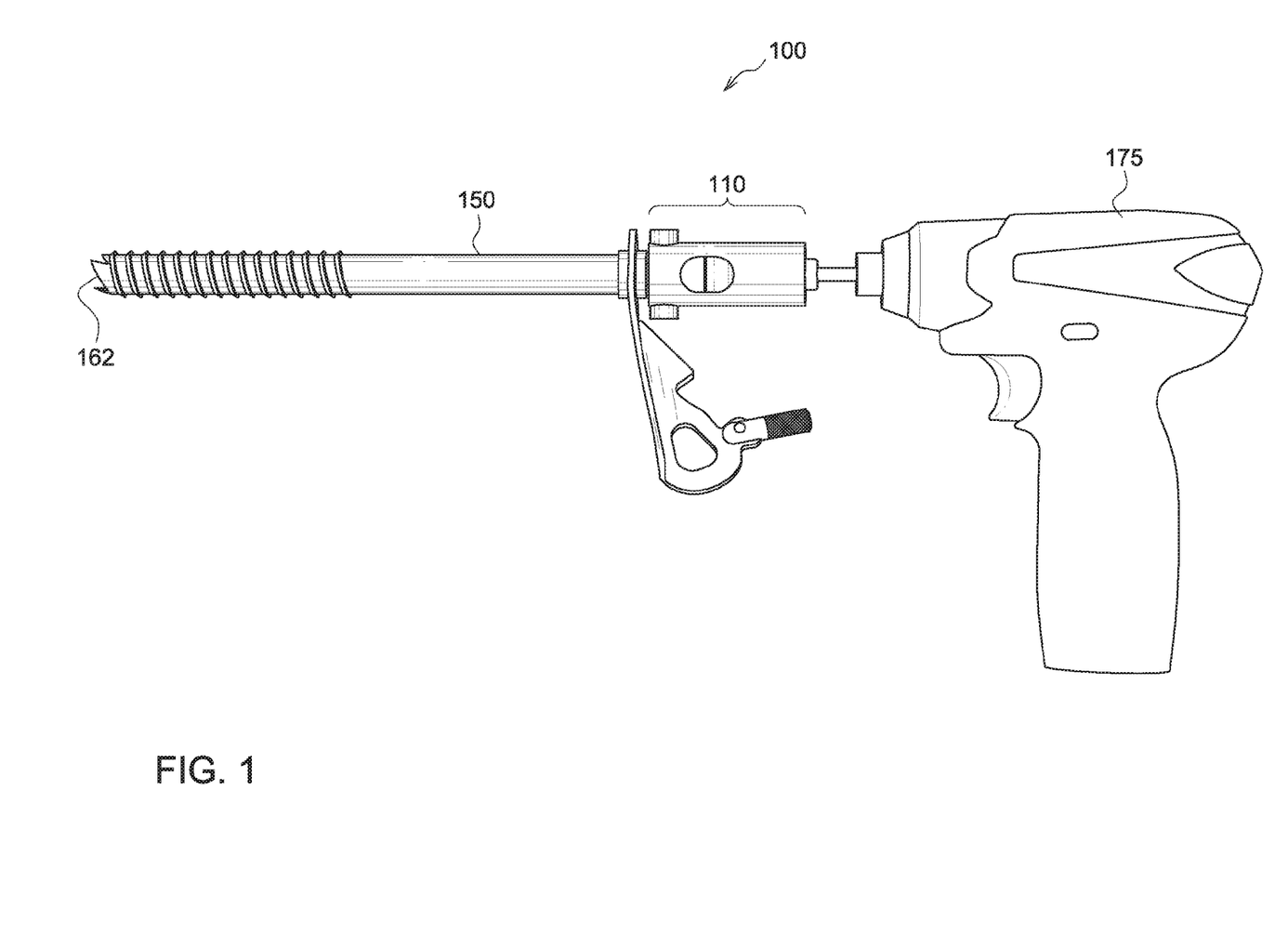
FIG. 1 is a side, elevation view of power ice screw system according to an embodiment of the present invention.
Figure 2:
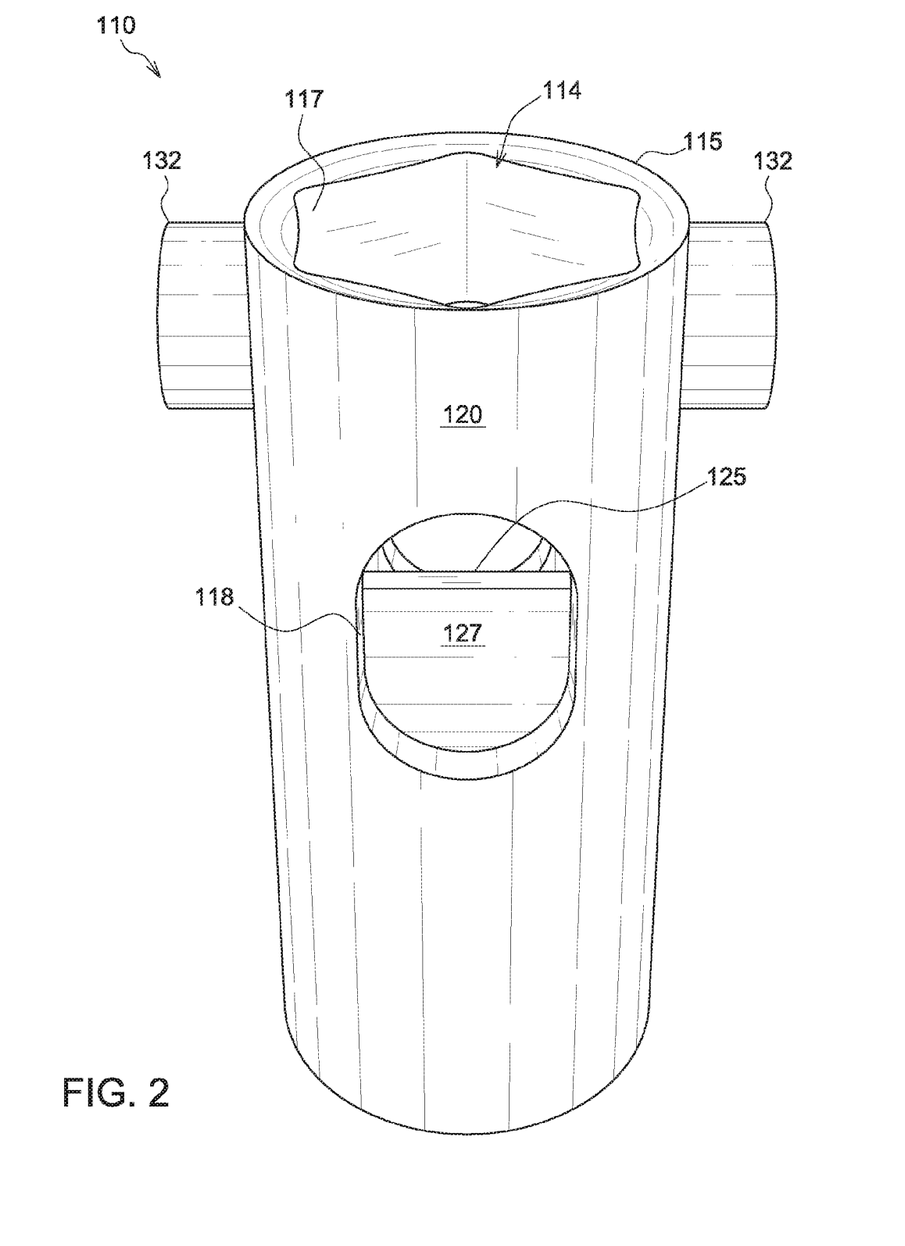
FIG. 2 is a side, perspective view of a screw adapter of a power ice screw system according to an embodiment of the present invention.
Figure 3:
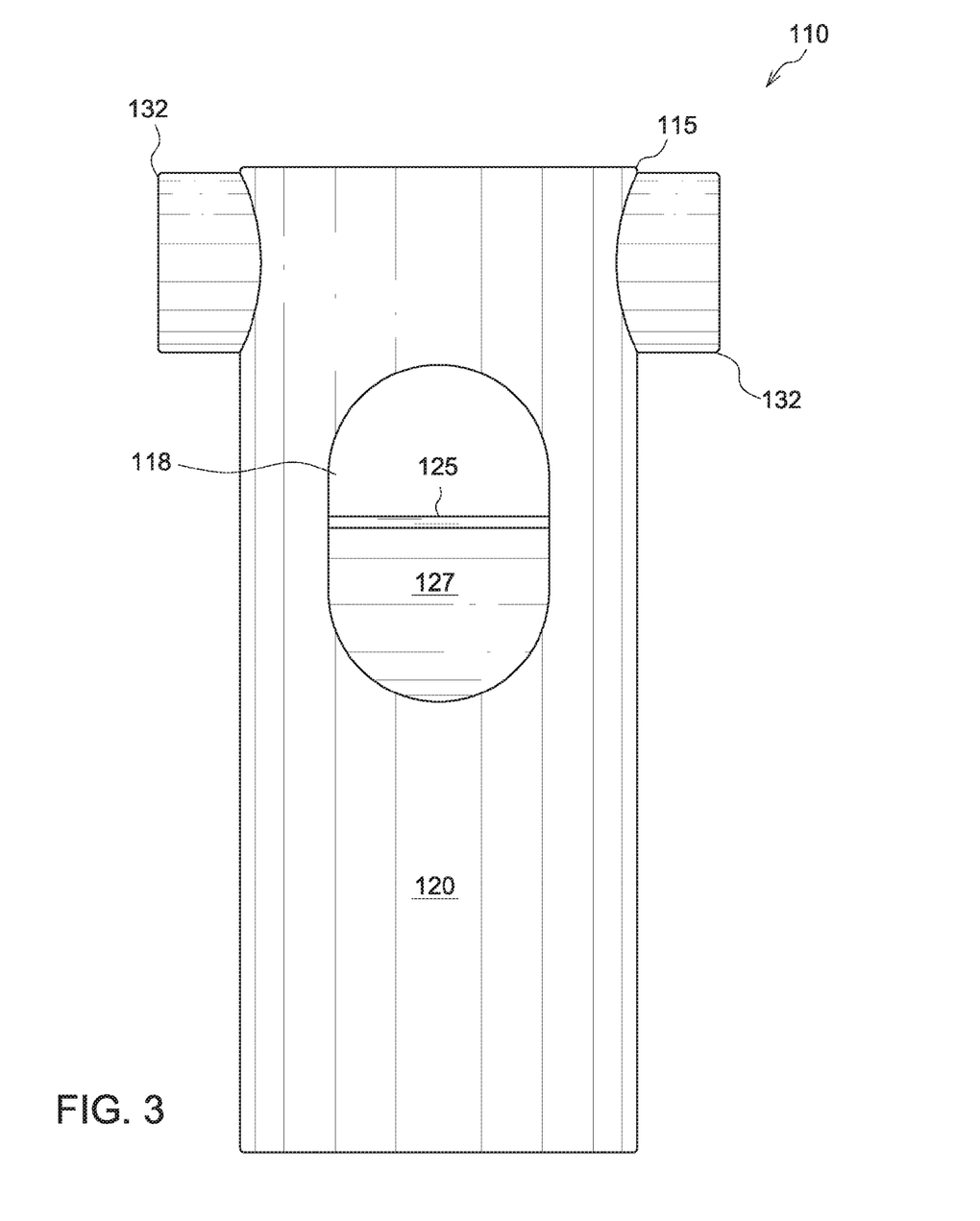
FIG. 3 is a side, elevation view of a screw adapter of a power ice screw system according to an embodiment of the present invention.
Figure 4:
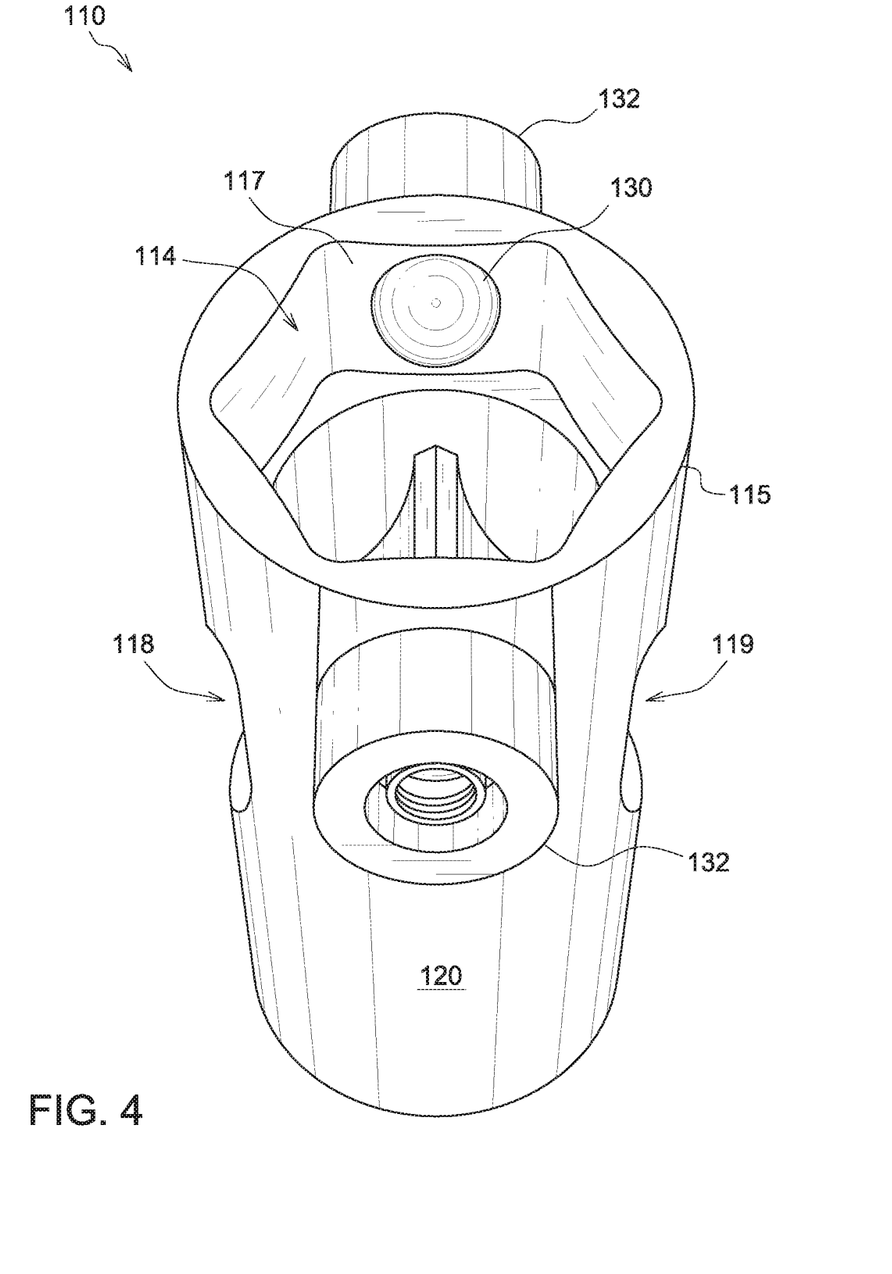
FIG. 4 is a perspective view of a screw adapter of a power ice screw system according to an embodiment of the present invention.
Figure 5:
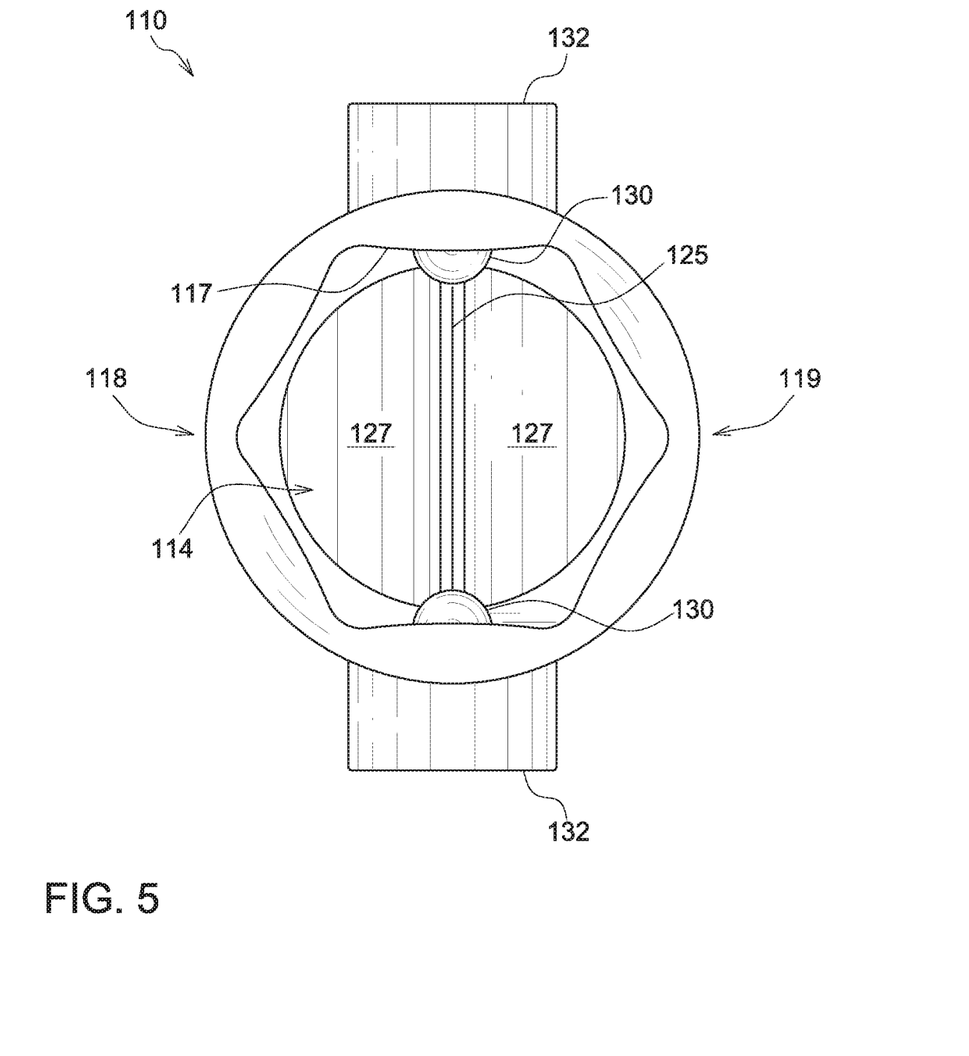
FIG. 5 is a plan, first end view of a screw adapter of a power ice screw system according to an embodiment of the present invention.
Figure 6:
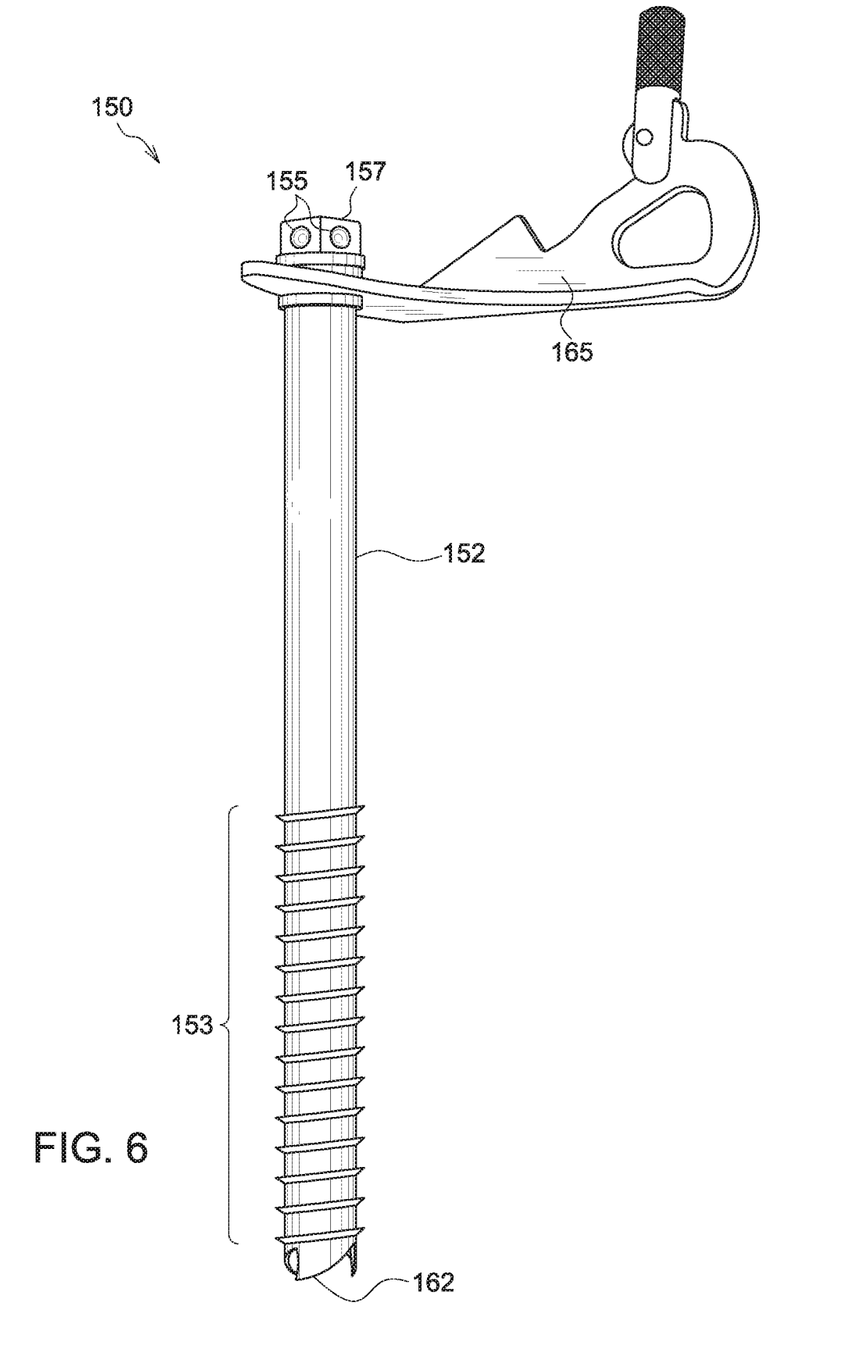
FIG. 6 is a side, elevation view of an ice screw of a power ice screw system according to an embodiment of the present invention.
Figure 7:
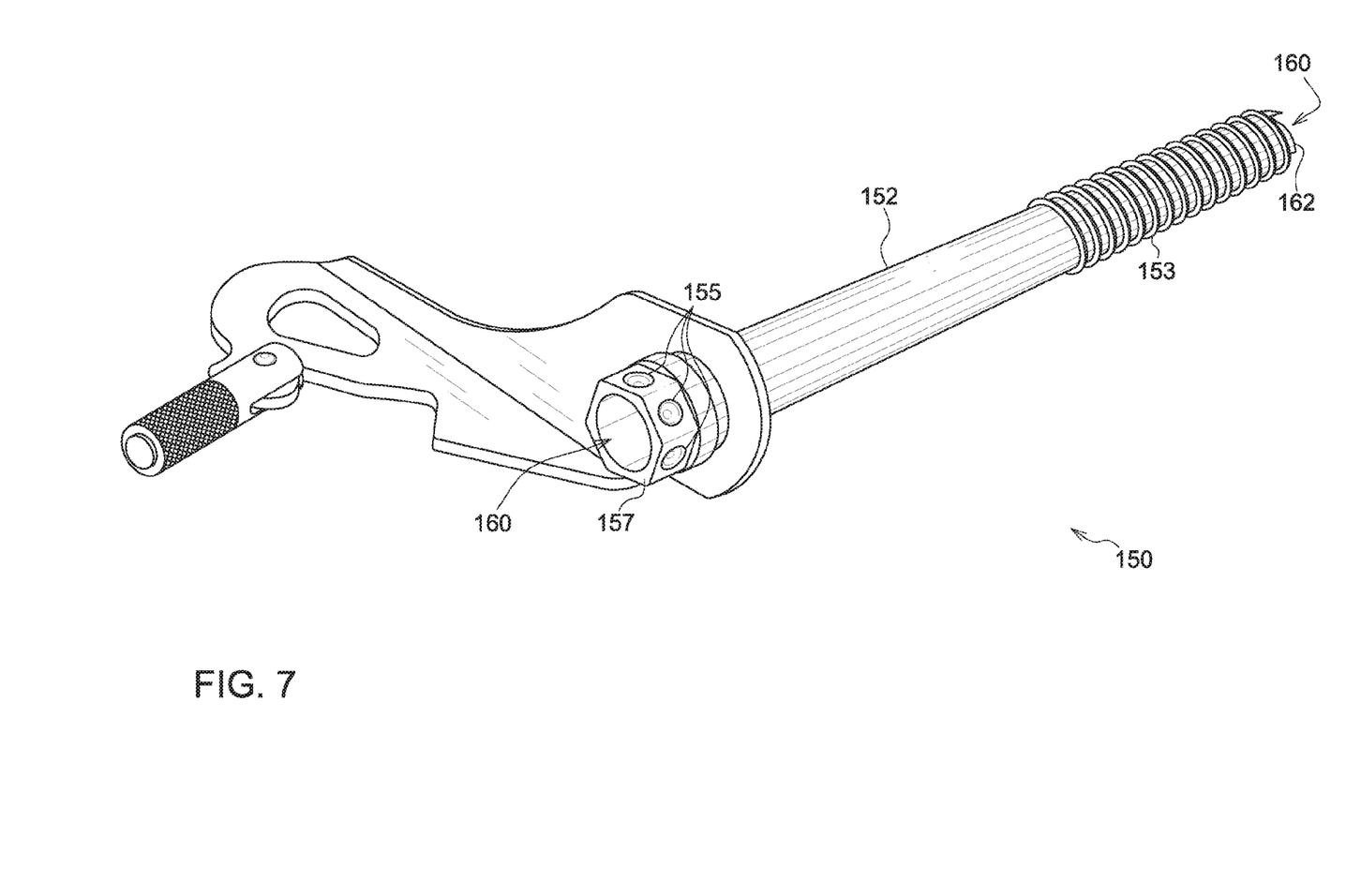
FIG. 7 is a perspective view of an ice screw of a power ice screw system according to an embodiment of the present invention.

As best seen in FIGS. 6 and 7, the ice screw 150 of the first embodiment power ice screw system includes a hollow shaft 152 on which are disposed external threads 153. The ice screw 150 further comprises a drive head 157 configured to be received and engaged by the receptacle 114 of the screw adapter 110. An open ended cavity 160 extends completely through the ice screw 150, from a cutting tip 162 of the screw 150 through the drive head 157. As best seen in FIG. 7, the open ended cavity 160 extends through the drive head 157, which results in the drive head 157 having a hollow center.

The first embodiment ice screw 150 typically includes a handle 165 for manual operation. The handle is typically used to remove the ice screw from the ice. The handle is typically not used when the ice screw is being driven by a power drill, in which case the handle rotates harmlessly.

Variations include ice screws with the surface of the hollow core having icephobic properties. The surface surfaces can be coated in Teflon (PTFE) or similar non-stick coatings, ceramic coatings and/or nano surface coatings. Suitable coatings have been developed for use on wind turbine blades and the wings of aircraft. One such coating developed by MicroPhase Coatings, Inc. of Garner, N.C. integrates epoxy polymers, silicate mesh and melting point depressants into its PhaseBreak™ line of anti-icing coating products. Another icephobic coating comprises HybridShield® by NanoSonic, Inc. of Pembroke, Va. Superhydrophobic metal-oxide thin films applied to the inside of an ice screw can substantially reduce ice adhesion therein. Additionally hydrophobic coatings by Aculon of San Diego, Calif. have been utilized as well.

Figure 8:
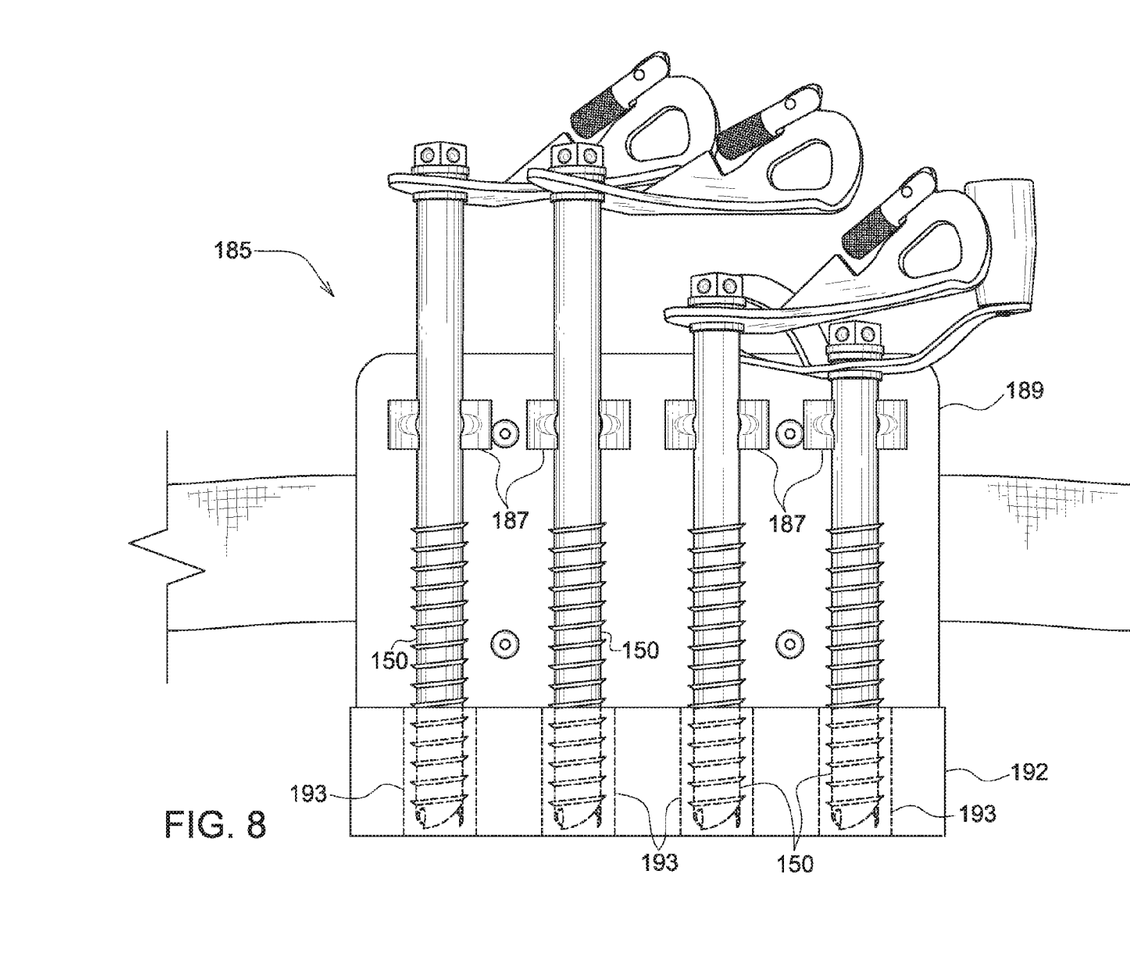
FIG. 8 is a side, elevation view of an ice screw holster of a power ice screw system according to an embodiment of the present invention.

As best shown in FIG. 8, the ice screw holster 185 of the first embodiment includes multiple screw catches 187, each of which is configured to hold a single ice screw 150 in an upright position. The ice screw holster 185 further comprises a lower compartment 192 configured to hold an ice screw end. The lower compartment typically includes one or more slots or tubes 193, each configured to receive an ice screw cutting tip and a portion of an ice screw hollow shaft while the ice screw is held upright by the screw catches 187.

The ice screw holster 185 is typically, but not necessarily, worn on an ice climber by use of a waist belt or climbing harness. Because a climber can assume a variety of positions while climbing ice, the ice screw holster 185 is built to hold the ice screw securely in various orientations, including upside down. The ice screw holster 185 facilitates one-handed operation of the power ice screw system, wherein a climber places a receptacle of a drill mounted screw adapter over an ice screw drive head. The detent of the adapter/ice screw combination secures the drive head in the receptacle, which enables the climber to remove the screw from the ice screw holster without needing to grasp the screw with his or her hand. Accordingly, the climber can hold his or her perch with one hand on an ice tool, the other hand holding the power drill with an ice screw adapter mounted thereto, and remove an ice screw from the rack with the drill/adapter combination. The climber can then actuate the power drill and perform a one-handed installation of the ice screw in an ice feature. In some embodiments, the ice screw holster includes a waist belt. Variations include an ice screw holster built into or otherwise integrated with a climbing harness.

In another variation, the drill is secured to the climbing harness proximate a climber's chest. The climber can remove a screw from the holster or his waist belt and insert the screw into the screw adapter on the drill. He can then pop the drill/screw combination out of the holster and proceed to installing the screw in an ice feature.

A Second Embodiment Power Ice Screw System with an Associated Drive Head Adapter A second embodiment power ice screw system and its various components are described with reference to FIGS. 9-13 and as applicable previous FIGS. 1-8. The second embodiment power ice screw system is similar to the first embodiment system substituting a drive head adapter 300 and a traditional ice screw 250 for the system specific ice screw 150 of the first embodiment. The screw adapter 110 and power drill 175 of the second embodiment are substantially similar to those of the first. The second embodiment power ice screw system can also include an ice screw holster 185 as shown in FIG. 8 and described supra.

Figure 9:
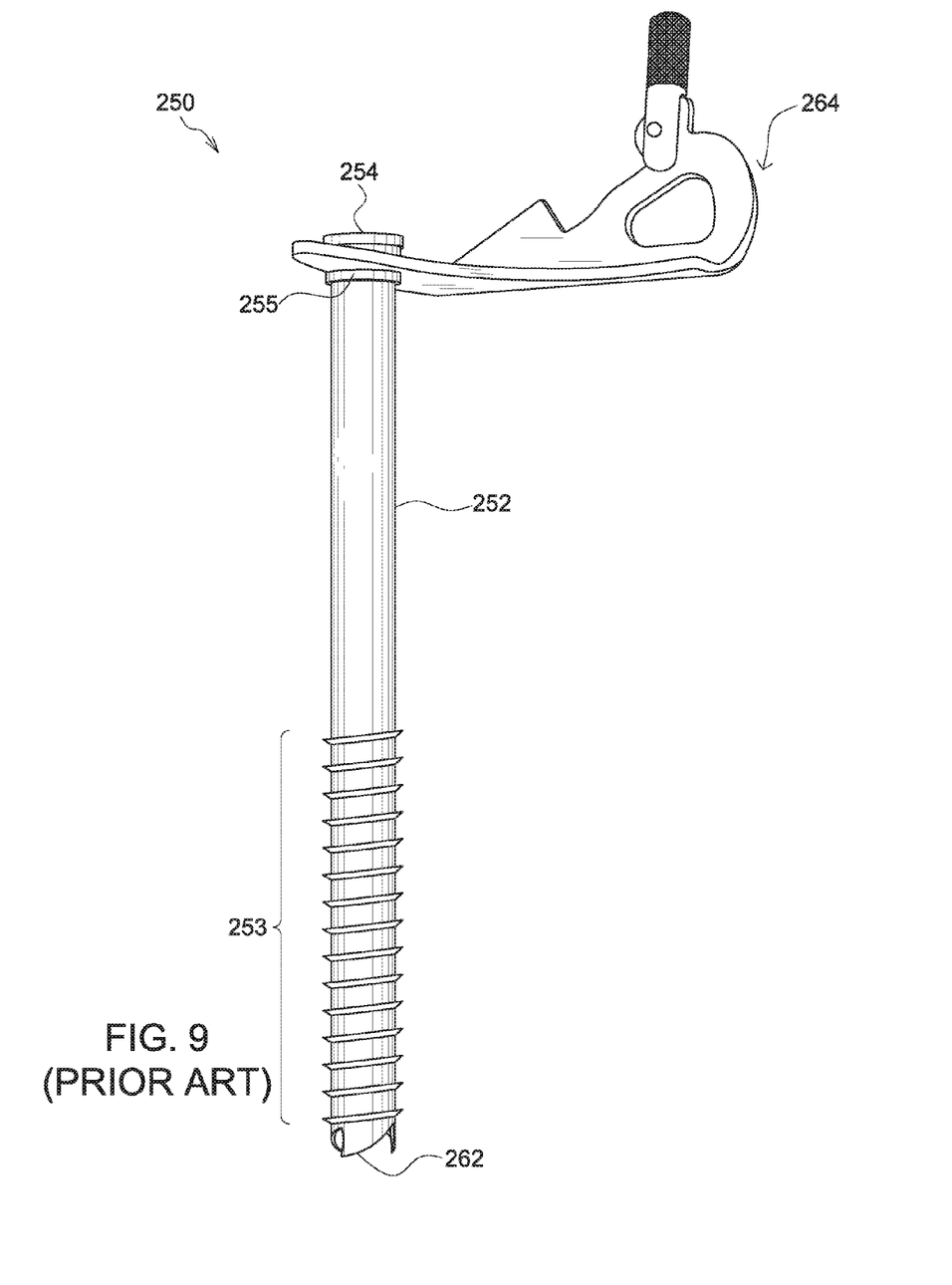
FIG. 9 is a side, elevation view of a typical prior art ice screw.

A typical prior art ice screw 250 is illustrated in FIG. 9. It is to be appreciated that the specific look of the screw while retaining essentially the same functionality can vary some between manufacturers. It is further appreciated that novel variations are contemplated that incorporate the icephobic coatings described above. A typical prior art ice screw includes a hollow shaft 252 on which are disposed external threads 253. The ice screw further comprises a pair of spaced apart annular flanges 254 & 255 that encircle the shaft at its top end. Of important and significant note, the section of the screw located between the flanges is typically not fully cylindrical but includes opposed straight and flat surfaces. These surfaces are configured to interface with a wrench/handle 264. The wrench/handle at a distal end encircles the shaft of the screw between the flanges and includes opposing flat surfaces that interface with the flat surfaces on the screw shaft to facilitate the transfer of torque from the handle to the screw in use. Accordingly, the handle in prior art screws is typically used to drive and subsequently remove the ice screw from the ice. When a drive head adapter 300 is removably affixed to the screw and the screw is being driven by the drill, the handle is not used and instead rotates harmlessly. An open ended cavity (not shown but similar to cavity 160 of FIG. 7) extends completely through the ice screw 250, from a cutting tip 262 through the top end forming an elongated hollow center.

Figure 10:
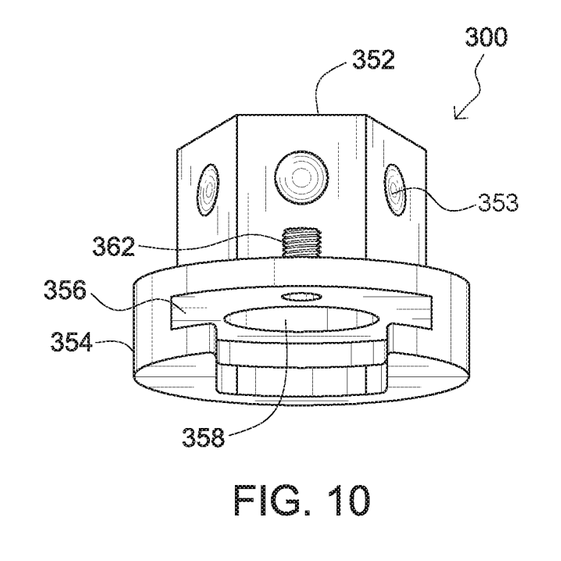
FIG. 10 is a first front perspective view of a drive head adapter according to an embodiment of the present invention.
Figure 11:
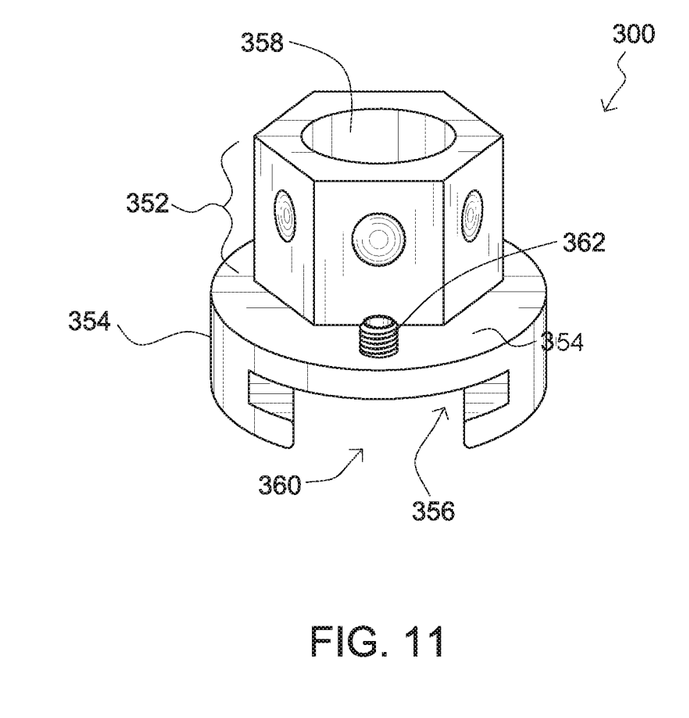
FIG. 11 is a second front perspective view of the drive head adapter according to an embodiment of the present invention.
Figure 12:
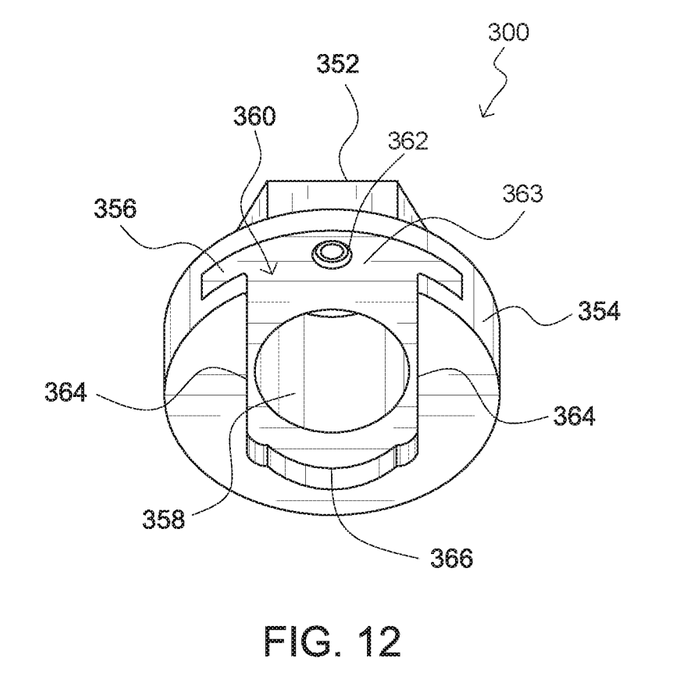
FIG. 12 is a bottom perspective view of the drive head adapter according to an embodiment of the present invention.
Figure 13:
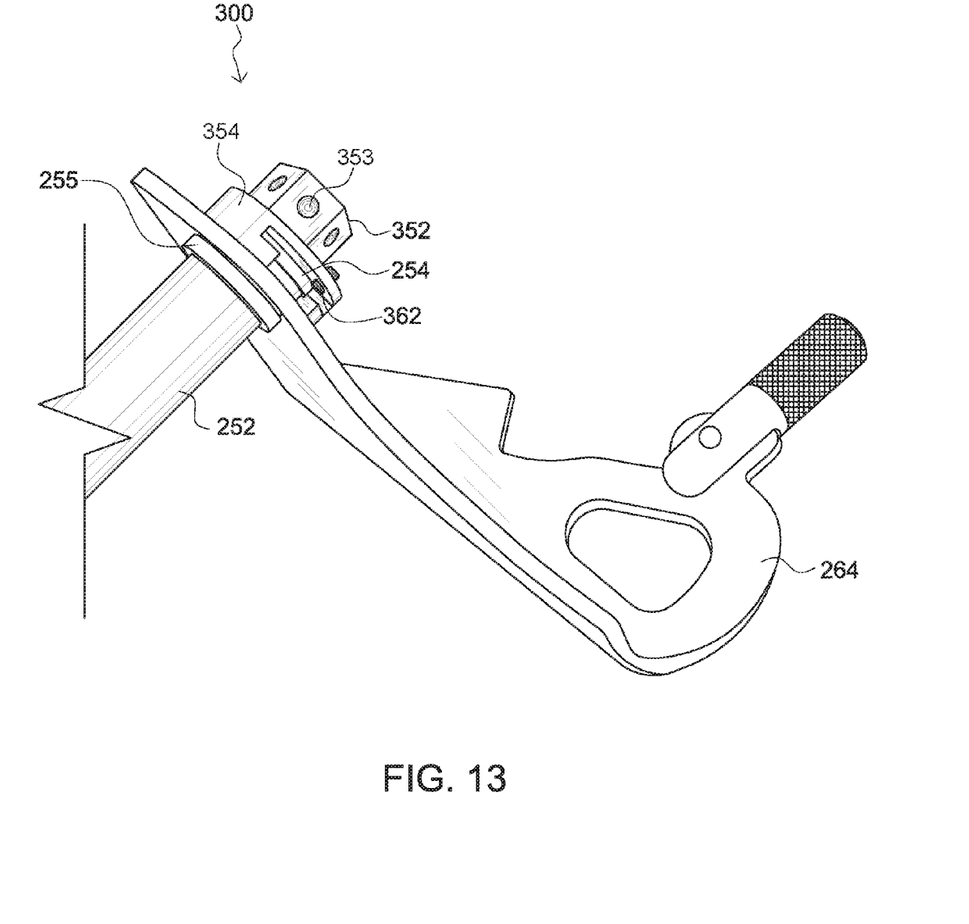
FIG. 13 is a close up perspective showing the drive head adapter installed on an ice screw according to one embodiment of the present invention.

FIGS. 10-12 provide various views of the drive head adapter 300. FIG. 13 shows the drive head adapter removably secured to a prior art ice screw 250. The adapter, which except for a set screw 362 is typically fabricated from a single unitary piece of metal, comprises a drive head portion 352 generally similar to the drive head 157 of the first embodiment screw 150. The head is configured to be received in the receptacle 114 of the screw adapter 110 in a mating fashion. A hexagonal head is illustrated but heads having differing configurations are contemplated along with screw adapters having corresponding differently shaped receptacles. One or more of the faces of the drive head include recesses 353 formed therein to receive the protrusions 130 of the screw adapter and secure the drive head onto the screw adapter as described above.

The drive head 352 includes a center bore 358 that essentially aligns with the hollow cavity of the ice screw allowing ice to be passed there through from the cavity during use. The interior of the bore can also have a friction reducing icephobic surface coating applied to it that facilitates the movement of the ice through the bore.

An attachment portion 354 of the drive head adapter is provided beneath the drive head 352 to attach and operatively secure the drive head to the top end of an ice screw. In the illustrated embodiment, a slot 356 adapted to slidably receive the top annular flange 254 of the ice screw 250 therein such that the ice screw cavity and the center bore 358 substantially align. The bottom side walls of the slot as best shown in FIG. 12 include a rectangular shaped opening 360 with an open end 363, a curved closed end 366 and opposing straight edges 364 extending between the ends. These edges are configured and adapted to be operatively and matingly received over the flat surfaces of the screw shaft located between the flanges 254 & 255. In use the open end 363 is slid over the top annular flange until the leading edge of the flange contacts the closed end 366 of the slot 356. Once seated the user sets a set screw by threading it over the trailing edge of the annular flange thereby locking the adapter to the ice screw 250. In combination, the prior art ice screw and the drive head adapter function in manner substantially identically to the specialized ice screw described in reference to the first embodiment. However, unlike the specialized ice screw, the drive head adapter can be removed from the screw by loosening the set screw and transferred to other screws should the original screw become damaged or a climber upgrades his/her screws.

Other attachment portions are contemplated that utilize different attachment mechanisms than the slotted means described herein to attach a drive head to an ice screw. In one variation, the attachment mechanism portion comprises a first and second piece. The two pieces of the attachment mechanism portion are joined by screws or other fasteners around the top of the ice screw effectively clamping it in place with flat surfaces on the attachment portion interfacing with the flat surfaces of the ice screw. On one version, the drive head resides on one of the pieces. In another version, the drive head itself can be segmented between the pieces only to be formed in whole when they pieces are clamped together around the screw. Some variations may use a hinged clamp. Some variations of the attachment portion may require that the wrench handle be removed from the screw to facilitate attachment of the drive head adapter. In yet other contemplated variations, the drive head adapter clamps onto or is mechanically fastened, such as with threaded screws to the wrench/handle itself making use of the torque transferring arrangement of the interfacing flat edges and flat surfaces of the screw shaft and the wrench/handle already in place.

The drive head adapter is typically comprised of steel although adapters fabricated from other metals are contemplated as well. Composite or reinforced plastic adapters are possible as well especially if the screw adapter 110 is also made of a like material. Generally, materials like steel or titanium are preferred for durability. The adapter is typically cast, forged, machined or fabricated as a single piece using any suitable combination of processes. Variations are contemplated where the adapter is fabricated from two or more pieces that are welded or mechanically joined to create a finished unit.

Alternative Embodiments and Variations

The various embodiments and variations thereof, illustrated in the accompanying Figures and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention.

I claim:

1. An ice screw system comprising:
   an ice screw and a socket, the ice screw including:
      an ice cutting tip;
      a drive head being adapted to receive the correspondingly-shaped socket thereover; and
      an open ended cavity extending from the cutting tip through the drive head;
   wherein the socket includes a debris clearing port adapted to expel ice entering the socket from within the cavity of the ice screw;
   wherein the drive head portion includes a plurality of flat sides and includes a recess on at least one flat side.

2. The ice screw system of claim 1 in combination with a power drill, the power drill including the correspondingly-shaped socket operatively coupled to the drive head of the ice screw.

3. The ice screw system of claim 2, wherein the correspondingly-shaped socket includes a magnet.

4. The ice screw of claim 1, the ice screw further comprising:
   a pair of spaced apart flanges; and
   a handle located between the pair of flanges;
   wherein the drive head is located above the pair of flanges.

5. An ice screw system for use with a power drill, the ice screw system comprising:
   an ice cutting tip;
   a drive head receiving a correspondingly-shaped socket thereover;
   an open ended cavity extending from the cutting tip through the drive head; and
   a pair of spaced apart flanges;
   wherein (i) the drive head is located above the pair of flanges, and (ii) the socket includes a debris clearing port.

6. The ice screw of claim 5, wherein a handle is located between the pair of flanges.

7. The ice screw of claim 6, wherein the drive head is located outside the pair of flanges.

8. The ice screw system of claim 5, wherein the drive head is operatively coupled to the correspondingly-shaped socket.

9. The ice screw system of claim 8, wherein the correspondingly-shaped socket includes a magnet configured to prevent the ice screw from falling from the correspondingly-shaped socket when the drive head is operatively coupled to the correspondingly-shaped socket.

10. The ice screw system of claim 8, wherein the correspondingly-shaped socket and the drive head collectively include a detent configured to prevent the ice screw from falling from the correspondingly-shaped socket when the drive head is operatively coupled to the correspondingly-shaped socket.

11. An ice screw system comprising:
an ice screw and a socket, the ice screw including:
    an ice cutting tip located at a first end of the ice screw;
    a drive head located at a second end of the ice screw, the drive head being configured to receive the socket thereover; and
    an open ended cavity extending from the cutting tip through the drive head;
wherein the socket includes a debris clearing port.

12. The ice screw of claim 11, wherein the drive head portion includes a plurality of flat sides and includes a recess on at least one flat side.

13. The ice screw system of claim 11, wherein the drive head is operatively coupled to the socket.

14. The ice screw system of claim 13, wherein the socket includes a magnet configured to prevent the ice screw from falling from the socket when the drive head is operatively coupled to the socket.

15. The ice screw system of claim 13, wherein the socket and the drive head collectively include a detent configured to prevent the ice screw from falling from the socket when the drive head is operatively coupled to the socket.

16. The ice screw of claim 11, wherein the ice screw further includes a pair of flanges located below the drive head.

17. A method of implementing the system of claim 1, the method comprising:
    obtaining the ice screw;
    obtaining the socket; and
    coupling the socket to the ice screw.

* * * * *